No. 608,261. Patented Aug. 2, 1898.
J. KOOPMAN.
SWARM PREVENTER FOR BEEHIVES.
(Application filed Nov. 6, 1897.)

(No Model.)

WITNESSES
Horace R. Wheeler
O. B. Baenziger

INVENTOR
John Koopman,
By R. B. Wheeler + Co.
Attorneys.

UNITED STATES PATENT OFFICE.

JOHN KOOPMAN, OF FALMOUTH, MICHIGAN.

SWARM-PREVENTER FOR BEEHIVES.

SPECIFICATION forming part of Letters Patent No. 608,261, dated August 2, 1898.

Application filed November 6, 1897. Serial No. 657,603. (No model.)

*To all whom it may concern:*

Be it known that I, JOHN KOOPMAN, a citizen of the United States, residing at Falmouth, in the county of Missaukee, State of Michigan, have invented a new and useful Improvement in Swarm-Preventers for Beehives; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to a device for preventing the swarming of bees; and it consists in the construction of parts hereinafter more fully set forth, and pointed out particularly in the claims.

The object of the invention is to provide simple and effective means for preventing the swarming of bees by dividing the brood-chamber into independent divisions, in one of which the queen may be confined while the process of the hatching of the brood continues in the other sections of the brood-chamber, which object is attained by the construction illustrated in the accompanying drawings, in which—

Figure 1:
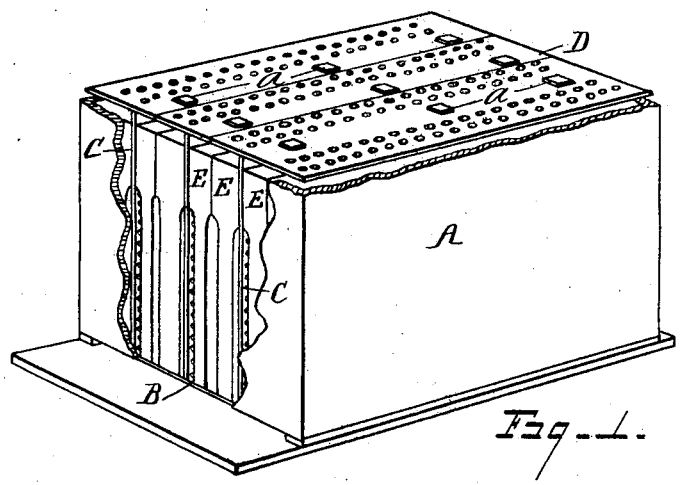
Figure 2:
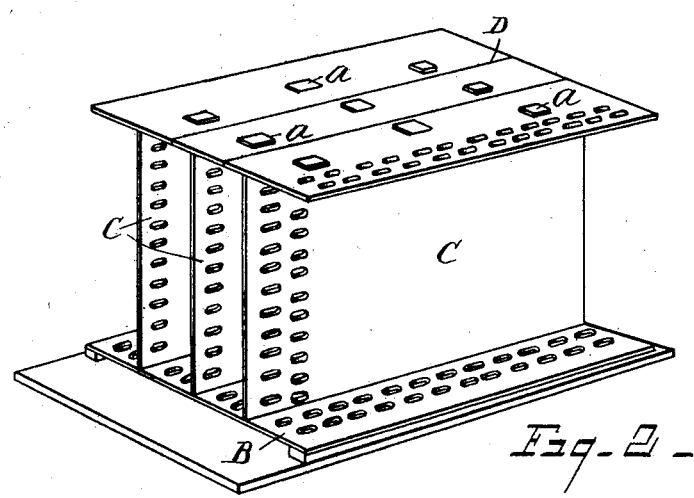
Figure 3:
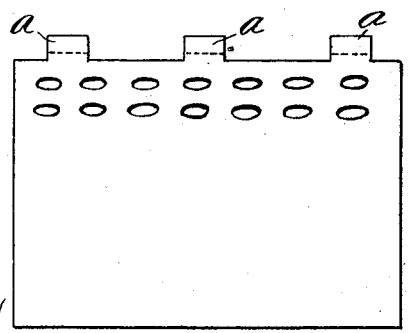

Figure 1 is a perspective view of that part of a hive known as the "brood-chamber" provided with my improved swarm-preventing device, portions of the hive being broken away to more clearly show the construction and arrangement of parts. Fig. 2 is a perspective of the swarm-preventing device removed from the hive. Fig. 3 is a plan of one of the vertical perforated partitions which effect a division of the brood-chamber.

Referring to the letters of reference, A designates the lower portion of a hive comprising a large interior chamber in which the cases containing the comb-cells for the brood are located. The upper portion of the hive (not shown) comprises a series of removable sections in which the honeycomb proper is located.

The instinct of the bees prompts them to swarm when the cells of the brood-comb in the brood-chamber are filled with brood-bees. If the queen is given access at all times to all portions of the brood-chamber, she will soon fill all of the brood-cells and keep them filled as fast as the new bees hatch out, which will result in a congested condition of the hive and cause the working bees to swarm. By the use of my improved device the queen is confined within one-fourth of the space of the brood-chamber, so that the remaining three-fourths of the brood-cells are allowed to hatch out, which overcomes any crowding in the brood-chamber and obviates the disposition on the part of the bees to swarm. To accomplish this division of the brood-chamber, I employ a bottom plate B, which is provided with a series of perforations of such shape as to permit of the free passage of the working bees, but which prevents the passage of the queen. This plate is raised slightly above the bottom of the hive, so as to permit the bees to pass under and upward through said perforations.

C designates a series of vertical plates provided with perforations similar to those of plate B and which serve to divide the hive into four vertical divisions. Said plates rest upon the base-plate B and are connected at their upper edge with a sectional horizontal plate D, having like perforations, being secured to said plates C by means of tongues $a$, extending therefrom, which pass through apertures in said sectional plate D and are bent over onto the face thereof, as clearly shown in Figs. 1 and 2.

It will be seen that each of the dividing-plates C is connected independently with a section of the sectional top plate D, which permits of a removal of a portion of the comb, if desired, without disturbing the other portion thereof.

The sectional plate D stands adjacent to the top of the brood-chamber and distant above the top of the cases E, (shown in Fig. 1,) in which the comb is located and which fill the brood-chamber, said cases being separated into independent divisions by means of the dividing-plates C, which pass between them.

The swarm-preventer is designed to be placed in the hive just before the bees begin to make preparation to swarm. From the fact that the queen bee cannot pass through the perforations of the several plates, she is confined, when the swarm-preventer is inserted in the hive, within a small portion of the brood-chamber, preventing her from having access to the remaining portions of the brood-cells, which remain empty after the hatching out of the new bees. The queen may then be transferred to one of the divisions of the brood-chamber in which the cells are empty, which she will proceed to fill. At the same time the brood-bees in the division in which the queen was last confined will hatch out, so that at no time will there be more than one-fourth of the brood-cells filled, in which condition of affairs the bees will not be so liable to swarm.

By leaving off the perforated bottom piece and placing the remaining portion of the swarm-preventer in the hive of a new swarm it serves the purpose of compelling them to build straight combs.

The perforated plates comprising this swarm-preventer are made, preferably, of zinc, but any suitable material may be employed, and while I have shown three of the vertical dividing-plates it is evident that a lesser or greater number may be employed without departing from the spirit of my invention.

Having thus fully set forth my invention, what I claim as new, and desire to secure by Letters Patent, is—

1. In a swarm-preventer, the combination with the hive, of the upper and lower horizontal perforated plates located therein forming the top and bottom of the brood-chamber respectively, the vertical perforated dividing-plates resting on the lower perforated plate and forming independent compartments within the brood-chamber, the upper horizontal perforated plate being composed of independent sections which are secured independently to the upper edges of said vertical dividing-plates.

2. In a swarm-preventer, the combination with the hive, of the upper and lower perforated plates forming the top and bottom of the brood-chamber respectively, the perforated dividing-plates located therein forming compartments within the brood-chamber and having tongues extending from their upper edges, the upper horizontal perforated plate consisting of independent sections having openings which receive the tongues of said divided plates, which tongues enter said openings and are bent over therein, whereby said sections are secured to said dividing-plates, enabling each section and its attached dividing-plate to be removed independently of the other sections.

In testimony whereof I affix my signature in presence of two witnesses.

JOHN KOOPMAN.

Witnesses:
 ISAAC KELLEY,
 HUGH McVEAN.